US008566569B2

(12) United States Patent
Bonanno et al.

(10) Patent No.: US 8,566,569 B2
(45) Date of Patent: Oct. 22, 2013

(54) STATE MACHINE-BASED FILTERING OF PATTERN HISTORY TABLES BASED ON DISTINGUISHABLE PATTERN DETECTION

(75) Inventors: James J. Bonanno, Wappingers Falls, NY (US); Brian R. Prasky, Wappingers Falls, NY (US); Joshua M. Weinberg, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 12/822,357

(22) Filed: Jun. 24, 2010

(65) Prior Publication Data

US 2011/0320792 A1    Dec. 29, 2011

(51) Int. Cl.
*G06F 9/00* (2006.01)
(52) U.S. Cl.
USPC .......................................................... 712/240
(58) Field of Classification Search
None
See application file for complete search history.

(56) References Cited

U.S. PATENT DOCUMENTS

| | | | | |
|---|---|---|---|---|
| 5,577,217 A | * | 11/1996 | Hoyt et al. | 712/200 |
| 5,687,360 A | * | 11/1997 | Chang | 712/240 |
| 5,758,142 A | * | 5/1998 | McFarling et al. | 712/239 |
| 6,269,438 B1 | * | 7/2001 | Chang | 712/233 |
| 2004/0225872 A1 | | 11/2004 | Bonanno et al. | |
| 2005/0257036 A1 | | 11/2005 | Prasky et al. | |

OTHER PUBLICATIONS

Falcon et al.; "Prophet/Critic Hybrid Branch Prediction"; Proceedings 31st Annual International Symposium on Computer Architecture 2004.
P.Y. Chang et al.; "Improving Branch Prediction Accuracy by Reducing Pattern History Table Interference". In the proceedings of the International Conference on Parallel Architectures and Compilation Techniques, pp. 48-57; Oct. 1996.
Scott McFarling, "Combining Branch Predictors" DEC WRL Technical Note TN-36 Jun. 1993; pp. 1-29.
Seznec et al., "A Case for (partially) TAgged GEometric History Length Branch Prediction"; Proceedings, 31st Annual International Symposium on Computer Architecture 2004.

* cited by examiner

*Primary Examiner* — Jacob A Petranek
(74) *Attorney, Agent, or Firm* — Cantor Colburn LLP; John Campbell

(57) ABSTRACT

Machine-based filtering of a pattern history table includes identifying a matching previous occurrence of a current branch instruction in an address history vector (AHV), the AHV storing addresses, or partial addresses, of most recently occurring branch instructions. In response to determining a direction history of the previous occurrence matches a direction history of the current branch, the machine-based filtering includes comparing the outcome of the previous occurrence with the outcome of the current branch instruction, and preventing the pattern history table from being updated with the outcome of the current branch instruction when the outcome of the previous occurrence does not match the outcome of the current branch instruction.

21 Claims, 5 Drawing Sheets

| OCCURRENCE OF BRANCH | 8-BIT GLOBAL HISTORY | OUTCOME |
|---|---|---|
| 1 | XXXXXXXX | T(1) |
| 2 | XXXXXXX1 | T(1) |
| 3 | XXXXXX11 | T(1) |
| 4 | XXXXX111 | T(1) |
| 5 | XXXX1111 | T(1) |
| 6 | XXX11111 | T(1) |
| 7 | XX111111 | T(1) |
| 8 | X1111111 | T(1) |
| 9 | 11111111 | T(1) |
| 10 | 11111111 | N(0) |

FIG. 1

| PATTERN LENGTH | NO. VECTOR ENTRIES TO COMPARE | MOST RECENT ADDRESS + DIRECTION HISTORY VECTOR | CURRENT BRANCH |
|---|---|---|---|
| 1 | 9 | *pppppppp* p | p' |
| 2 | 10 | *pqpqpqpq* pq | p' |
| 3 | 11 | *qrpqrpqr* pqr | p' |
| 4 | 12 | *pqrspqrs* pqrs | p' |
| 5 | 13 | *rstpqrst* pqrst | p' |
| 6 | 14 | *tupqrstu* pqrstu | p' |
| 7 | 15 | *vpqrstuv* pqrstuv | p' |
| 8 | 16 | *pqrstuvw* pqrstuvw | p' |

FIG. 2

STATE MACHINE-BASED FILTERING OF PATTERN HISTORY TABLES BASED ON DISTINGUISHABLE PATTERN DETECTION

BACKGROUND

This invention relates generally to branch prediction, and more specifically, to state machine-based filtering in pattern history tables.

In computer architecture, a branch predictor is the part of a processor that determines whether or not a conditional branch in an instruction flow of a program is likely to be taken. Branch predictors allow processors to fetch and execute instructions without waiting for a branch to be resolved. One type of branch predictor is a bimodal predictor that utilizes a branch history table (BHT) of two-bit entries and is indexed with part or all of the instruction addresses. The bimodal predictor provides high accuracy on most branches, particularly those that are dominant. Dominant branches refer to those that often exhibit the same direction (i.e., taken/not taken). However, the bimodal predictor is known to be much less accurate in predicting non-dominant branches (which do not reliably exhibit the same direction) as compared with dominant branches.

Pattern-based prediction algorithms provide high accuracy for non-dominant branches but can be costly to implement in terms of chip area coverage and power consumption requirements. A branch predictor using a pattern history table (PHT) is based on paths leading up to the given branch. By basing the prediction value on the path that was taken to get to the given branch, the directionally guessed path is no longer based on the general occurrence for a given branch, but rather a path of previous taken and not taken branches leading to the given branch. Such paths can be global paths where the path of the last 'n' number of branches is used to determine the guess of the current branch. The histories of branches' outcomes for encountered paths are stored in the pattern history table.

Hybrid branch prediction schemes have been developed that take advantage of the strengths of different predictors. For example, state machine-based filtering, uses a pattern-based predictor (e.g., share) only on non-dominant branches, which allows the predictor to be implemented with a much smaller pattern history table (PHT) than would otherwise be possible if dominant branches were included. The prediction state associated with each branch is updated according to a state machine that attempts to recognize those branches that would benefit from the PHT.

The PHT is indexed as a function of the outcomes (taken vs. not-taken) of previous branches. A fixed number of such previous branch outcomes are used. In some cases, different outcomes of the same branch will have the same PHT index. Oftentimes this is due to limited history length. In such cases, the PHT is not able to effectively correlate the pattern history with the branch's outcome and it is disadvantageous to use the PHT for such branches, particularly in a hybrid configuration where that PHT resource could be more effectively used to predict another branch.

BRIEF SUMMARY

An exemplary embodiment is a computer program product for state machine-based filtering of a pattern history table. The computer program product includes a tangible storage medium readable by a processing circuit and storing instructions for execution by the processing circuit for performing a method. The method includes identifying a matching previous occurrence of a current branch instruction in an address history vector (AHV), the AHV storing addresses, or partial addresses, of most recently occurring branch instructions. In response to determining a direction history of the previous occurrence matches a direction history of the current branch, the method includes comparing the outcome of the previous occurrence with the outcome of the current branch instruction, and preventing the pattern history table from being updated with the outcome of the current branch instruction when the outcome of the previous occurrence does not match the outcome of the current branch instruction.

Another exemplary embodiment is a system for implementing state machine-based filtering of a pattern history table. The system includes a computer processor and a prediction unit executing on the computer processor. The prediction unit implements a method. The method includes identifying a matching previous occurrence of a current branch instruction in an address history vector (AHV), the AHV storing addresses, or partial addresses, of most recently occurring branch instructions. In response to determining a direction history of the previous occurrence matches a direction history of the current branch, the method includes comparing the outcome of the previous occurrence with the outcome of the current branch instruction, and preventing the pattern history table from being updated with the outcome of the current branch instruction when the outcome of the previous occurrence does not match the outcome of the current branch instruction.

A further exemplary embodiment is a computer-implemented method for implementing state machine-based filtering in pattern history tables. The method includes identifying a matching previous occurrence of a current branch instruction in an address history vector (AHV), the AHV storing addresses, or partial addresses, of most recently occurring branch instructions. In response to determining a direction history of the previous occurrence matches a direction history of the current branch, the method includes comparing the outcome of the previous occurrence with the outcome of the current branch instruction, and preventing the pattern history table from being updated with the outcome of the current branch instruction when the outcome of the previous occurrence does not match the outcome of the current branch instruction.

An additional exemplary embodiment is a computer program product for state machine-based filtering of a pattern history table. The computer program product includes a tangible storage medium readable by a processing circuit and storing instructions for execution by the processing circuit for performing a method. The method includes identifying a matching previous occurrence of a current branch instruction in an address history vector (AHV), the AHV storing addresses of most recently occurring branch instructions. In response to determining a direction history of the previous occurrence matches a direction history of the current branch, the method includes comparing the outcome of the previous occurrence of the current branch instruction with a predicted outcome of the current branch instruction; and executing the current branch instruction according to the predicted outcome when the outcome of the direction history of the previous occurrence of the current branch instruction matches the predicted outcome.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates a table with sample data for branch occurrences including a history of branch outcomes;

FIG. 2 illustrates a table with sample data corresponding to a domain of unreliable patterns in a fixed-size pattern history table that are detectable using state machine-based filtering according to an exemplary embodiment;

DETAILED DESCRIPTION

Figure 3:
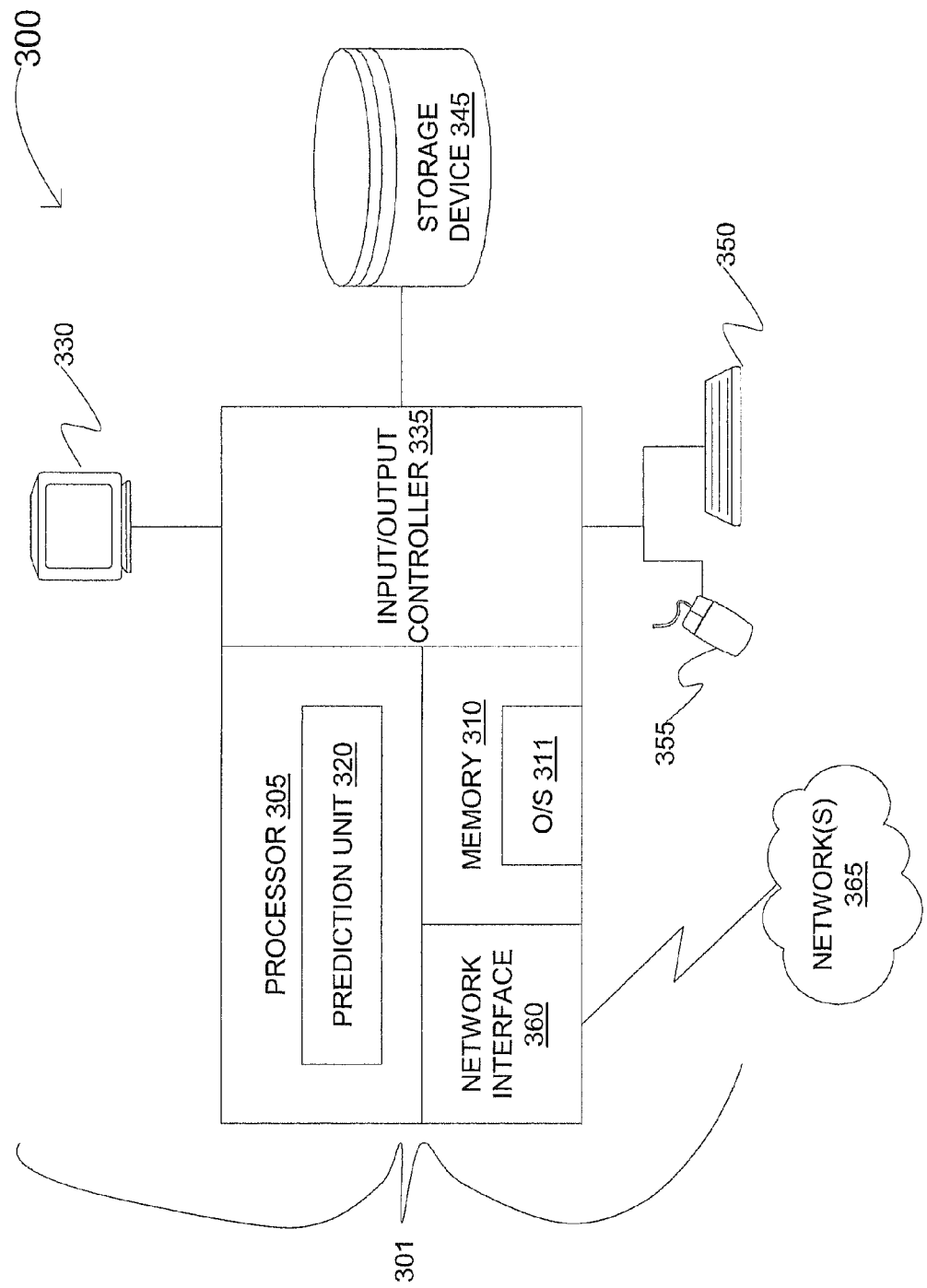
FIG. 3 illustrates a block diagram of a system for implementing state machine-based filtering of pattern history tables according to an exemplary embodiment.

Exemplary embodiments relate to distinguishing reliable patterns in a pattern history table (PHT) from those that are unreliable in predicting branch behavior. The exemplary embodiments further include taking appropriate actions in response to the distinction. In one exemplary embodiment, the distinction between reliable and unreliable patterns may be determined once the current branch instruction is resolved and its direction known. In this embodiment, the unreliable pattern refers to one in which a previous occurrence of a branch shares the same pattern history as that of a current branch, but the outcomes of both occurrences are different. In another exemplary embodiment, an unreliable pattern may be determined at the time of branch prediction and before the current branch is resolved. In this embodiment, the unreliable pattern refers to one in which the previous and current branches occurrences' pattern history match, but the previous occurrence's outcome is either the same or differs from the current branch's predicted direction.

The exemplary embodiments implement a hybrid prediction unit (also referred to herein as "prediction unit"), which assists in detecting unreliable patterns and acting in response to that detection to improve branch prediction accuracy. For example, the action taken may be preventing those branches that exhibit unreliable patterns from being written into and/or subsequently predicted from that PHT, thereby maintaining a minimal fixed size PHT and enabling greater branch prediction accuracy. In this manner, PHT resources would be allocated, updated, and/or used only for those branches that would benefit from the resources. Prediction accuracy is enhanced by influencing hybrid selection and/or prediction confidence estimation based on whether or not a PHT provides a prediction that is recognized as being a potential unreliable pattern occurrence.

FIGS. 1 and 2 depict tables of data that further illustrate unreliable patterns associated with a PHT. The table 100 of FIG. 1 illustrates an unreliable pattern resulting from a branch loop. As shown in table 100, a branch ends a loop (column 102, 'consecutive occurrences 1-10 of the branch') that is taken nine times and not taken one time (column 106, 'outcome of branch occurrences'). This example assumes that the loop does not contain any other branches. The not-taken occurrence (N(0)) in column 106 ends the loop. In this example, N refers to 'not taken' and (0) specifies the one-bit value shifted into the history vector to represent the outcome of a not taken branch, and T refers to 'taken' and (1) specifies the value which represents the outcome of a taken branch.

The type of branch described in the table 100 of FIG. 1 (i.e., one with 10 iterations of the loop) is not accurately predicted by a PHT that is indexed with less than 9 bits of history (global or local history in this example are equivalent) as reflected in column 104. This is because for such a PHT, the $10^{th}$ occurrence of the branch (the not-taken one) maps to the same PHT entry as at least one previous (taken) occurrence of the branch. In particular, as shown in table 100, the $9^{th}$ and $10^{th}$ occurrences of the branch would both access the same PHT entry with an 8-bit history consisting of all 1's (i.e., 8-bit global history entries 110). As shown in table 100, the outcome of the $9^{th}$ occurrence is taken (T(1)) while the outcome of the $10^{th}$ occurrence is not taken (N(0)). Thus, the PHT cannot reliably distinguish these two outcomes.

In the table 200 of FIG. 2, potential unreliable patterns that may be exhibited for a PHT having an 8-bit history are shown. The data in table 200 illustrate the form of these potential unreliable patterns in column 206. The exemplary state machine-based filtering processes described herein provide the ability to detect these unreliable patterns and take an appropriate action in response thereto. The data provided in the table 200 are used by the exemplary state machine-based filtering processes, as will be described further herein.

Turning now to FIG. 3, a block diagram of a system 300 for implementing state machine-based filtering of pattern history tables in accordance with exemplary embodiments will now be described. The methods described herein may be implemented in hardware, software, or a combination thereof. In an exemplary embodiment, the methods described herein are implemented in hardware and are part of a processor 305 (e.g., a microprocessor) of a computer system 301. The computer system 301 may be implemented as a special or general-purpose digital computer, such as a personal computer, workstation, minicomputer, or mainframe computer.

In an exemplary embodiment, in terms of hardware architecture, as shown in FIG. 3, the computer system 301 includes the processor 305, memory 310, and one or more input and/or output (I/O) devices or peripherals, such as a display 330, a storage device 345, a mouse 355, and a keyboard 350, that are each communicatively coupled to the computer system 301 via a local input/output controller 335. The input/output controller 335 may be, for example, one or more buses or other wired or wireless connections, and may include elements (omitted in FIG. 3 for simplicity), such as controllers, buffers (caches), drivers, repeaters, and receivers, to enable communications. Further, the I/O controller 335 may include address, control, and/or data connections to enable various communications among the aforementioned components.

The storage device 345 may be internal to the computer system 301 or may be external (e.g., a separate disk drive that is a physically attached and logically addressable by the computer system 301).

The processor 305 includes a hardware component that executes hardware operations and/or software instructions (e.g., instructions stored in memory 310). The processor 305 may be any custom made or commercially available processor, a central processing unit (CPU), an auxiliary processor among several processors associated with the computer system 301, a semiconductor based microprocessor (in the form of a microchip or chip set), a macroprocessor, a microprocessor, or generally any device for executing instructions. In an exemplary embodiment, the processor 305 includes a branch prediction unit (also referred to as "prediction unit") 320 for implementing state machine-based filtering in a hybrid prediction scheme, as will be described further herein.

The memory 310 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 may have a distributed architecture, where various components are situated remote from one another, but may be accessed by the processor 305.

The instructions in memory 310 may include one or more separate programs, each of which comprises an ordered listing of executable instructions for implementing logical functions. As illustrated in FIG. 3, the instructions in the memory 310 include an operating system (O/S) 311, which controls the execution of other computer programs and provides scheduling, input-output control, file and data management, memory management, and communication control and related services.

In an exemplary embodiment, the system 300 may further include a network interface 360 that provides a communicative coupling between the computer system 301 and one or more networks 365. The network(s) 365 may include an IP-based network for communication between the computer system 301 and any external network devices, e.g., via a broadband or other network connection. The network(s) 365 transmit and receive data between the computer system 301 and external systems. In an exemplary embodiment, network(s) 365 may include a managed IP network administered by a service provider. The network(s) 365 may be implemented in a wireless fashion, e.g., using wireless protocols and technologies, such as WiFi, WiMax, etc. The network(s) 365 may also include a packet-switched network such as a local area network, wide area network, metropolitan area network, Internet network, or other similar type of network environment. The network(s) 365 may include a fixed wireless network, a wireless local area network (LAN), a wireless wide area network (WAN) a personal area network (PAN), a virtual private network (VPN), intranet or other suitable network system and includes equipment for receiving and transmitting signals.

When the computer system 301 is in operation, the processor 305 is configured to execute instructions stored in local caches and/or instructions stored within the memory 310, to communicate data to and from the memory 310, and to generally control operations of the computer system 301 pursuant to the instructions. The prediction unit 320 provides direction prediction for branches that are in an instruction cache or other shared caches closer to memory. The prediction unit 320 is described further herein.

In an exemplary embodiment, where the state machine-based filtering methods are implemented in hardware, these filtering methods may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The computer system 301 may employ a processor instruction pipeline system architecture (not shown) in which the exemplary state machine-based filtering of pattern history tables may be implemented in accordance with an exemplary embodiment. Pipelining is one specific form of parallelism, where the execution of several instructions can be interleaved on the same hardware. The pipeline system architecture may include a number of states, such as an instruction fetch stage, a decode and operand access stage, an execute instruction stage, a data memory access stage, and a register write stage. The instruction fetch stage fetches instructions to be processed, the decode and operand access stage decodes the instruction and gathers the source operands needed by the instruction being processed, and the execute instruction stage performs the function of the instructions (e.g., arithmetic logic unit (ALU) operations). In addition, the data memory access stage performs any data memory access functions associated with the instruction, and the register write stage writes the appropriate result value into the register file.

Figure 4:
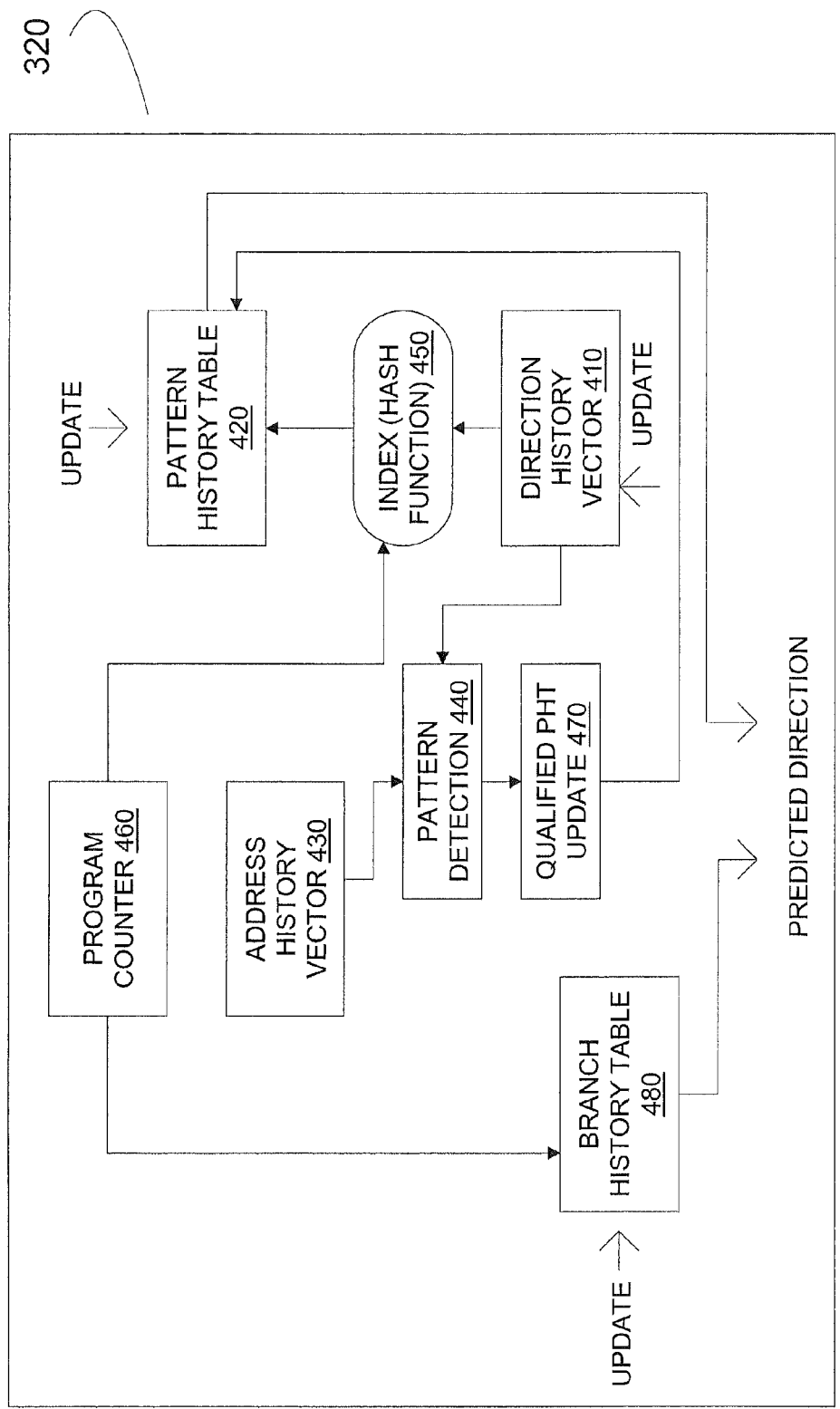
FIG. 4 illustrates a block diagram of a hybrid prediction unit in accordance with an exemplary embodiment.

Turning now to FIG. 4, a block diagram of the branch prediction unit 320 of FIG. 3 will now be described in accordance with an exemplary embodiment. In an exemplary embodiment, the branch prediction unit 320 may include a direction history vector (DHV) 410, a pattern history table (PHT) 420, an address history vector (AHV) 430, pattern detection logic 440, an index hash function (450), a program counter 460, qualified PHT update 470, and a branch history table (BHT) 480.

In an exemplary embodiment, the AHV 430 stores addresses, or partial addresses, for a number of the most recently occurring branch instructions in the pipeline. The AHV 430 receives these addresses, e.g., as entry additions resulting from execution (i.e., completion) of branch instructions. For each completing branch, address information is added into the AHV 430 and upon adding a new entry, the oldest occurring branch instruction is removed from the AHV 430. As a function of the branch address, a fixed number of bits are stored (e.g., these may be address bits themselves or may be a function of the address bits, such as an exclusive-OR). In an exemplary embodiment, the number of entries tracked in the AHV 430 is the same as the number of entries in the direction history vector 410. The AHV 430 provides input to the pattern detection logic 440, and the pattern detection logic 440 performs pattern matching on the AHV 430 and DHV 410. Qualified PHT updates 470 are derived from the pattern detection logic 440 and refer to matching patterns that are determined to be qualified for update into the PHT 420. These features are described further in FIG. 5.

In an exemplary embodiment, the BHT 480 maintains a record of a number of the most recent outcomes (taken or not-taken) for conditional branches and may be indexed by instruction addresses. An entry in the BHT 480 is selected in order to make a branch prediction. Entries in the BHT 480 may be added and updated upon completing branch instructions. A BHT entry may be updated according to a BHT state machine as a function of a predicted branch's outcome and whether the PHT 420 is being updated. A BHT entry may include an indication of whether or not to ever use the PHT 420 for a particular branch address.

In an exemplary embodiment, the PHT 420 contains the prediction history information about each history pattern. The PHT 420 may include tag bits consisting of the full or partial branch instruction address or other information to distinguish branches encountered in different contexts. The PHT 420 may be indexed as a function of the direction history vector 410 and the instruction address (i.e., the instruction to be searched). As illustrated in FIG. 4, indexing may occur via the hash function 450, which may be implemented as a bitwise exclusive-OR of the direction history vector 410 with the instruction address from the program counter 460. The hash function 450 may be implemented to compress the full or partial branch instruction address down to fewer bits per vector position.

In an exemplary embodiment, direction history vector 410 stores branch history data (outcomes) for branch instructions. The direction history vector 410 is configured to be twice the length (2*n) of that used for the PHT 420 index and maintains branch history outcomes corresponding to twice the length of the PHT 420 index. For a PHT 420 history size n, each possible unreliable pattern will have a length ("L") between 1 and n. However, detecting an unreliable pattern of length L requires comparing a current branch against the n+L most recent entries in the AHV 430 and direction history vector 410. For example, as shown in table 200 of FIG. 2, column 202 contains values that specify a possible pattern length L, which ranges from 1 through 8, whereby '8' is the number of entries indexed into the PHT 420. Column 204 contains values that reflect the number of AHV 430 and direction history vector 410 entries needed to compare (n+L) based upon the corresponding pattern length (L) in column 202.

Each entry in the AHV 430 and direction history vector 410 is represented by a single letter (e.g., using a branch address, or partial branch address, and hashing it with an n-bit history vector using, e.g., the hashing function 450). For example, as illustrated in the table 100 of FIG. 1, an entry for the $9^{th}$ occurrence of a branch indicates an 8-bit history of all 1's which in FIG. 2 is represented as the letter 'p.' This 9th occurrence refers to a previous occurrence of a current branch instruction, whereby the $10^{th}$ occurrence shown in table 100 (i.e., the most recent branch instruction) is referred to herein as a current occurrence of the branch instruction. The current branch may be represented as ' (prime), which means the value that represents the current branch in the AHV 430 is the same as the contents in the direction history vector 410 having the value p. However, the (') indicates that the direction outcome of the current branch differs from that of the occurrences of p in the direction history vector 410. It can be seen that the p highlighted in bold in column 206 of table 200 is indistinguishable from p' in the PHT with respect to the italicized 8-bit vector. As further illustration, consider a pattern of length '1.' The pattern consists of 9 p's (i.e., 'ppppppppp'). Each p represents a branch address and a direction. Relating back to FIG. 1, the direction pattern 110 is '111111111' and represents the previous 9 occurrences of the branch. The current occurrence, p' (which is shown in FIG. 1 as the $10^{th}$ occurrence and is further shown in column 208 of table 200), has the same address as the most recent previous p (which is shown in FIG. 1 as the $9^{th}$ occurrence), but p' has outcome 0 (as shown in column 106 of FIG. 1). Note that the rightmost p in the string of 9's has the same PHT index as p' but a different outcome. Next consider a pattern of length '2.' This pattern is illustrated as 'pqpqpqpqpq' in column 206 of FIG. 2. This pattern could be a direction pattern of all 1s but with 2 different branch addresses (i.e., p and q), or it could be a pattern of "10..." or "01..." with either the same or different branch addresses. As the pq pattern is repeated throughout the DHV 410, this 'p' is not distinguishable from the prior 'p.'

Figure 5:
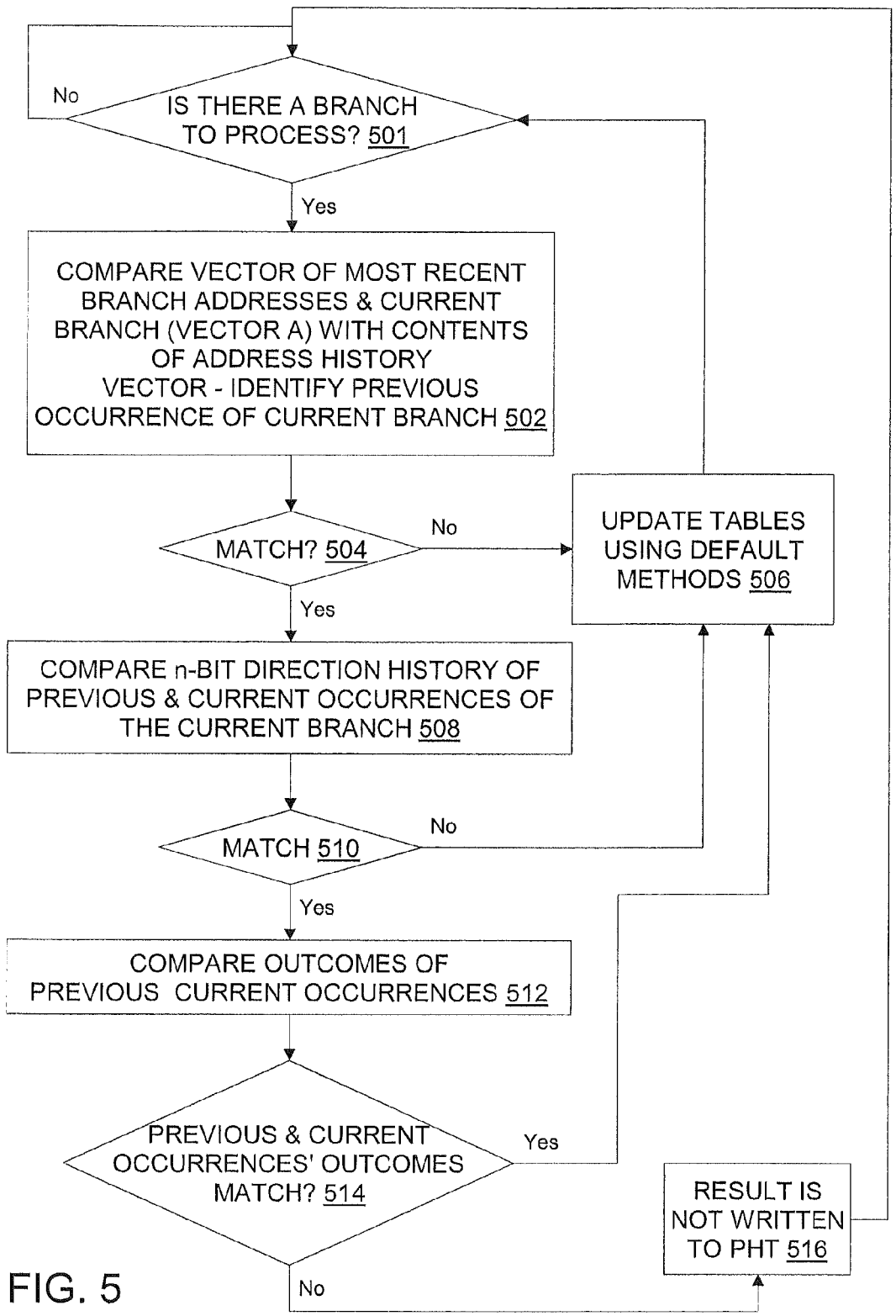
FIG. 5 is a flow diagram describing a process for implementing state machine-based filtering of pattern history tables in accordance with an exemplary embodiment.

Turning now to FIG. 5, an exemplary process for implementing the state machine-based filtering of pattern history tables will now be described. As indicated above, the prediction unit 320 facilitates the detection of unreliable history patterns in the PHT 420 and implements one or more actions in response thereto. In an exemplary embodiment, these unreliable patterns may be detected and acted upon in response to resolution of a current branch for which the branch outcome is known. The process described in FIG. 5 illustrates this embodiment. However, it will be understood that alternative exemplary embodiments may detect and act upon suspected unreliable patterns prior to the branch resolution (e.g., during the branch prediction phase of the pipeline), as will be described further herein.

In an exemplary embodiment, the process of FIG. 5 begins whereby a determination is made whether a branch is to be processed at step 501. If not, the process loops back to step 501. Otherwise, if there is a branch to be processed, the prediction unit 320 determines if a matching previous occurrence of the current branch exists in the address history vector 430. This may be implemented by considering the most recent n−1 branch addresses in the AHV 430 and the current branch address as being an n-bit vector A. At block 502, the vector A is compared with the contents of the address history vector 430 (i.e., (2*n)-entry vector). The previous occurrence of the current branch is identified from the address history vector 430.

If any consecutive n-entry subset of the address history vector 430 matches vector A at block 504, this means a sequence of branch addresses immediately preceding and leading up to the current branch in the vector A matches a consecutive n-entry subset of branch addresses in the AHV 430; that is, the current branch is identified as one that has a pattern of previous branch occurrences, as detected in the AHV 430. However, if there is no consecutive n-entry subset of the address history vector 430 matching vector A at block 504, then this means that the sequence of branch addresses leading to the current branch does not match any of the most recent branch addresses in the vector A. In this instance, the prediction unit 320 updates the appropriate tables using default methods (e.g., BHT 480, PHT 420 according to established methods at block 506 (e.g., established prediction algorithms may be implemented for determining whether to update various tables, and how these tables should be updated) and the process returns to block 501.

Returning to block 504, if any consecutive n-entry subset of the address history vector 430 matches vector A, the prediction unit 430 compares the n-bit global direction history of previous and current occurrences of the current branch at block 508. For example, consider AHV=pqpqpqpqPq and the current branch's AHV value is p. The capitalized P is possibly a previous occurrence of the current branch p as determined by step 504. Suppose also the DHV 410 corresponding to the above AHV is 1010101010. This means that the 8-bit subset of the DHV highlighted in italics which corresponds to the PHT index for the previous occurrence P of the current ranch p is the same value as the 8-bit subset of the DHV subsequently highlighted in italics for the current branch's PHT index: 1010101010 as determined in step 510 described further herein. In this example, 0s and 1s are used to represent the DHV values, and letters are used to represent the AVH values. If the DHV above was different, then step 510 could fail. An example of this might be 1000101010. The PHT index of P (based on 10001010) is different than the current branch's PHT index (based on 00101010) . . . . As described above in FIG. 2, every letter represents both an AHV value and a DHV value. So in table 200, every letter (e.g., p) has the same branch address as every other p and also has the same direction history (i.e., either all 0s or all 1s). If the n-bit global direction history of previous occurrence of the current branch matches the n-bit global direction history of the current occurrence of the current branch at block 510, then this means the two n-bit pattern histories for each of the previous and current branches are identical. Otherwise, if the n-bit global direction history of previous occurrence of the current branch does not match the n-bit global direction history of the current occurrence of the current branch at block 510, this means the n-bit pattern histories are different and the prediction unit 320 updates the appropriate tables (e.g., BHT 480, PHT 420 according to established methods at block 506 and the process returns to block 501.

Turning back to block 510, if the n-bit global direction history of previous occurrence of the current branch matches the n-bit global direction history of the current occurrence of the current branch, the outcomes of the previous and current branch occurrences are compared at block 512. The outcomes are compared by using the n+L entries of the direction history vector 410 in order to ascertain the outcomes, whereby the outcomes extend beyond the 8-bit history pattern that is maintained in the PHT 420. The direction history is maintained in such a way that it is updated speculatively upon a prediction, and is able to be restored and corrected upon encountering unpredicted branches or upon detecting a branch prediction was wrong. For any branch being predicted, an n-bit direction history of previous branches is implemented in order to read from the appropriate location in the PHT 420. At that time, the directions of the previous 'n' branches are used in the logic which generates the PHT read index. Similarly at update time (e.g., performed upon branch completion) an n-bit DHV is implemented in order to index the PHT 420 for write operations. At one or more designated locations in the pipeline where this pattern matching is applied (e.g., at competition time and/or at other time frames such as prediction time), 2*n length history vectors (direction and address) are maintained in order to carry about the processes described here in FIG. 5. The pattern length 'L' may be determined via one or more of steps 502, 504, 508, and 510. Based on the results of the comparison, if the previous and current branch occurrences' outcomes match at block 514, this means PHT history represents a reliable pattern (i.e., is determined to reliably predict future outcomes). Otherwise, if the previous and current branch occurrences' outcomes do not match at block 514, this means the PHT history represents an unreliable pattern (i.e., is determined to be unreliable in predicting future outcomes) and so the result is prevented by the prediction unit 320 from being written to the PHT 420 at block 516 and the process returns to block 501.

Returning to block 514, if the previous and current occurrences' outcomes match, the prediction unit 320 updates the PHT 420 with the current branch outcome at block 506 using default methods, and the process returns to block 501.

As indicated above, a potential unreliable pattern may also be detected at prediction time (i.e., before the current branch is resolved) by applying the previously described processes of FIG. 5 with modifications. For example, in block 510 the prediction unit 320 compares the current predicted direction to match with the previous matching predicted occurrences. Whether or not the current predicted direction matches the previous matching predicted occurrences, this indicates a low confidence that the pattern is a reliable pattern as the pattern has exceeded the capabilities of the given PHT. In this instance, the unreliable pattern is not used to predict the outcome of the branch. As a potential unreliable pattern may be used as an indication of lower confidence of the prediction from this PHT, this confidence can be used to influence the prediction. For example, a different predictor may be selected as part of the hybrid configuration. If combining several hybrid predictions may give the detected unreliable PHT predictor less weight than some of the others, both possible paths may be speculatively executed for certain low confidence predictions. This can be beneficial in various types of hybrid branch predictor implementations.

In one exemplary embodiment, the prediction unit 320 may be configured to detect unreliable patterns of all lengths or only a subset of them. In the exemplary embodiment of a hybrid tagged-PHT+BHT+bimodal BHT configuration where information about the branch is stored in a branch target buffer (not shown) indexed by branch address, the following actions may be taken in response to unreliable pattern detection. The PHT with the unreliable pattern is not written. The BTB indicates never to use the PHT for a branch until after it is encountered with a reliable pattern that qualifies for being written into the PHT. In this configuration the use of a tagged PHT also nearly always ensures that branches that are sometimes encountered with reliable patterns, and sometimes with unreliable patterns, only use the PHT for reliable patterns since the PHT tag will not match for unreliable patterns (the write was blocked) unless there is aliasing due to the limited tag size.

Technical effects and benefits include the ability to detect unreliable patterns in a pattern history table and take action in response to that detection in order to improve branch prediction accuracy. The actions include preventing branches that exhibit unreliable patterns to be written into and/or subsequently predicted from the pattern history table, thereby maintaining a minimal fixed size pattern history table and enabling greater branch prediction accuracy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
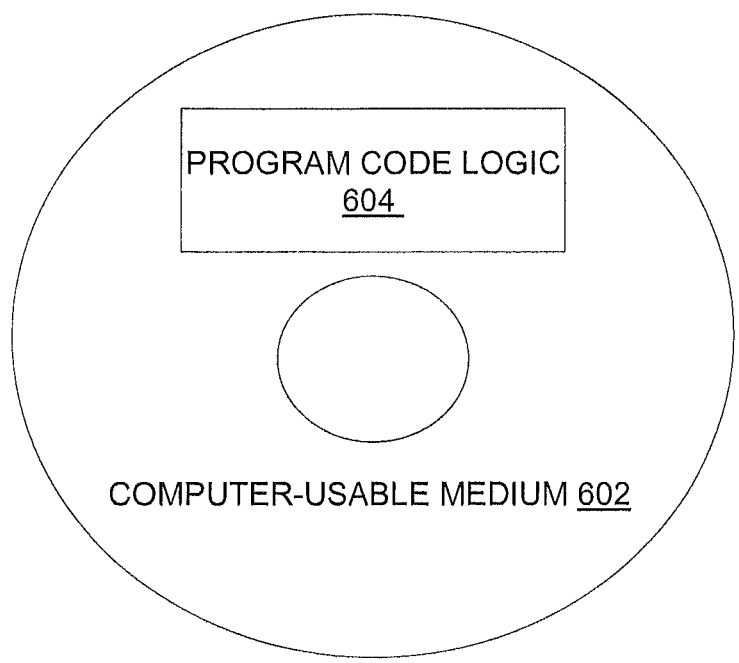
FIG. 6 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 600 as depicted in FIG. 6 on a computer usable medium 602 with computer program code logic 604 containing instructions embodied in tangible media as an article of manufacture. Exemplary articles of manufacture for computer usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for state machine-based filtering of a pattern history table, the pattern history table comprising an n-bit index, the computer program product comprising:
a non-transitory tangible storage medium readable by a processing circuit and storing instructions for execution by the processing circuit for performing a method comprising:
identifying a matching previous occurrence of a current branch instruction in an address history vector, the address history vector storing addresses of most recently occurring branch instructions; and
based on determining a direction history of the previous occurrence of the current branch instruction matches a direction history of the current branch instruction, the direction history of the previous occurrence of the current branch instruction is stored in a direction history vector configured to maintain a number of entries that are twice the number of entries maintained in the pattern history table, the method further comprising:
comparing the outcome of the previous occurrence of the current branch instruction with the outcome of the current branch instruction; and
preventing the pattern history table from being updated with the outcome of the current branch instruction based on the outcome of the previous occurrence of the current branch instruction not matching the outcome of the current branch instruction.

2. The computer program product of claim 1, wherein the method further comprises:
comparing a vector A with contents of the address history vector, the vector A comprising addresses of most recently occurring n−1 branch instructions of the address history vector and an address of the current branch instruction;
wherein, based on comparing the vector A with the contents of the address history vector, vector A matches contents of the address history vector based on a sequence of branch addresses immediately preceding the address of the current branch instruction in the vector A matching a sequence of addresses in the address history vector.

3. The computer program product of claim 2, wherein the method further comprises:
determining a pattern length L of outcomes for the previous occurrence of the current branch instruction, the pattern length L ranging from 1 through n;
wherein comparing the outcome of the previous occurrence of the current branch instruction with the outcome of the current branch instruction includes comparing outcomes from n+L entries in the direction history vector.

4. The computer program product of claim 2, wherein the address history vector maintains a number of entries that is twice the number of entries maintained in the pattern history table.

5. The computer program product of claim 1, wherein the pattern history table is indexed by combining a value of the direction history vector with the address of the current branch instruction, wherein the combining is a logical function including an exclusive-OR.

6. A system for state machine-based filtering of a pattern history table, the system comprising:
a computer processor comprising a branch prediction unit for predicting outcomes of branch instructions and updating tables corresponding to the outcomes, the branch prediction unit further comprising the pattern history table, an address history vector, and a direction history vector, the branch prediction unit is configured to perform a method, comprising:
identifying a matching previous occurrence of a current branch instruction in the address history vector, the address history vector storing addresses of most recently occurring branch instructions; and
based on determining a direction history of the previous occurrence of the current branch instruction matches a direction history of the current branch instruction, the direction history of the previous occurrence of the current branch instruction is stored in the direction history vector, the direction history vector configured to maintain a number of entries twice the number of entries maintained in the pattern history table, the method further comprising:
comparing the outcome of the previous occurrence of the current branch instruction with the outcome of the current branch instruction; and
preventing the pattern history table from being updated with the outcome of the current branch instruction based on the outcome of the previous occurrence of the current branch instruction not matching the outcome of the current branch instruction.

7. The system of claim 6, further comprising:
a vector A, the vector A comprising addresses of most recently occurring n−1 branch instructions of the address history vector and an address of the current branch instruction, wherein the method further comprises:
comparing the vector A with contents of the address history vector;
wherein based on comparing the vector A with the contents of the address history vector, vector A matches contents of the address history vector based on a sequence of branch addresses immediately preceding the address of the current branch instruction in the vector A matching a sequence of addresses in the address history vector.

8. The system of claim 7, wherein the method further comprises:
determining a pattern length L of outcomes for the previous occurrence of the current branch instruction, the pattern length L ranging from 1 through n;
wherein comparing the outcome of the previous occurrence of the current branch instruction with the outcome of the current branch instruction includes comparing outcomes from n+L entries in the direction history vector.

9. The system of claim 7, wherein the address history vector maintains a number of entries that is twice the number of entries maintained in the pattern history table.

10. The system of claim 6, wherein the pattern history table is indexed by combining a value of the direction history vector with the address of the current branch instruction, wherein the combining is a logical function including an exclusive-OR.

11. A computer implemented method for state machine-based filtering of a pattern history table, the pattern history table comprising an n-bit index, the method comprising:
identifying a matching previous occurrence of a current branch instruction in an address history vector, the address history vector storing addresses of most recently occurring branch instructions; and
based on determining a direction history of the previous occurrence of the current branch instruction matches a direction history of the current branch instruction, the direction history of the previous occurrence of the current branch instruction is stored in a direction history vector configured to maintain a number of entries twice the number of entries maintained in the pattern history table, the method configured to perform:

comparing the outcome of the previous occurrence of the current branch instruction with the outcome of the current branch instruction; and preventing the pattern history table from being updated with the outcome of the current branch instruction based on the outcome of the previous occurrence of the current branch instruction not matching the outcome of the current branch instruction.

12. The method of claim 11, further comprising:

comparing a vector A with contents of the address history vector, the vector A comprising addresses of most recently occurring n−1 branch instructions of the address history vector and an address of the current branch instruction;

wherein, based on comparing the vector A with the contents of the address history vector, vector A matches contents of the address history vector based on a sequence of branch addresses immediately preceding the address of the current branch instruction in the vector A matching a sequence of addresses in the address history vector.

13. The method of claim 12, further comprising:

determining a pattern length L of outcomes for the previous occurrence of the current branch instruction, the pattern length L ranging from 1 through n;

wherein comparing the outcome of the previous occurrence of the current branch instruction with the outcome of the current branch instruction includes comparing outcomes from n+L entries in the direction history vector.

14. The method of claim 12, wherein the address history vector maintains a number of entries that is twice the number of entries maintained in the pattern history table.

15. The method of claim 1, wherein the pattern history table is indexed by combining a value of the direction history vector with the address of the current branch instruction, wherein the combining is a logical function including an exclusive-OR.

16. A computer program product for state machine-based filtering of a pattern history table, the pattern history table comprising an n-bit index, the computer program product comprising:

a non-transitory tangible storage medium readable by a processing circuit and storing instructions for execution by the processing circuit for performing a method comprising:

identifying a matching previous occurrence of a current branch instruction in an address history vector, the address history vector storing addresses of most recently occurring branch instructions; and based on determining a direction history of the previous occurrence of the current branch instruction matches a direction history of the current branch instruction, the direction history of the previous occurrence of the current branch instruction is stored in a direction history vector configured to maintain a number of entries twice the number of entries maintained in the pattern history table, the method configured to perform:

comparing the outcome of the previous occurrence of the current branch instruction with a predicted outcome of the current branch instruction; and executing the current branch instruction according to the predicted outcome based on the outcome of the direction history of the previous occurrence of the current branch instruction not matching the predicted outcome.

17. The computer program product of claim 16, wherein the method further comprises:

assigning a confidence value to an n-bit pattern history of the current branch instruction reflecting a high confidence in the predicted outcome, the assigning implemented based on determining the predicted outcome matches the outcome of the direction history of the previous occurrence of the current branch instruction.

18. The computer program product of claim 16, wherein the method further comprises:

comparing a vector A with contents of the address history vector, the vector A comprising addresses of most recently occurring n−1 branch instructions of the address history vector and an address of the current branch instruction;

wherein, based on comparing the vector A with the contents of the address history vector, vector A matches contents of the address history vector based on a sequence of branch addresses immediately preceding the address of the current branch instruction in the vector A matching a sequence of addresses in the address history vector.

19. The computer program product of claim 18, wherein the method further comprises:

determining a pattern length L of outcomes for the previous occurrence of the current branch instruction, the pattern length L ranging from 1 through n;

wherein comparing the outcome of the previous occurrence of the current branch instruction with the predicted outcome of the current branch instruction includes comparing outcomes from n+L entries in the direction history vector.

20. The computer program product of claim 18, wherein the address history vector maintains a number of entries that is twice the number of entries maintained in the pattern history table.

21. The computer program product of claim 16, wherein the pattern history table is indexed by combining a value of the direction history vector with the address of the current branch instruction, wherein the combining is a logical function including an exclusive-OR.

* * * * *